(12) United States Patent
Ji et al.

(10) Patent No.: US 12,534,549 B2
(45) Date of Patent: Jan. 27, 2026

(54) POLYELECTROLYTE HYDROGEL COATING WITH STRONG SUBSTRATE BINDING PERFORMANCE AND METHOD OF MANUFACTURING THE SAME

(71) Applicant: ZHEJIANG UNIVERSITY, Hangzhou (CN)

(72) Inventors: Jian Ji, Hangzhou (CN); Kefeng Ren, Hangzhou (CN); Jing Wang, Hangzhou (CN); Xingwang Wang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 636 days.

(21) Appl. No.: 17/963,255

(22) Filed: Oct. 11, 2022

(65) Prior Publication Data

US 2023/0033929 A1   Feb. 2, 2023

Related U.S. Application Data

(63) Continuation of application No. PCT/CN2022/085269, filed on Apr. 6, 2022.

(51) Int. Cl.
*C08F 20/06* (2006.01)
*C08F 20/56* (2006.01)

(52) U.S. Cl.
CPC .............. *C08F 20/06* (2013.01); *C08F 20/56* (2013.01)

(58) Field of Classification Search
None
See application file for complete search history.

(56) References Cited

U.S. PATENT DOCUMENTS

2007/0106023 A1   5/2007   Bender et al.

FOREIGN PATENT DOCUMENTS

| CN | 1448144 | A | 10/2003 |
| CN | 102977271 | A | 3/2013 |
| CN | 104761745 | A | 7/2015 |
| CN | 108159505 | A | 6/2018 |
| CN | 109796616 | A | 5/2019 |
| CN | 111686310 | A | 9/2020 |
| CN | 112625534 | A | 4/2021 |
| EP | 3385340 | A1 | 10/2018 |
| WO | 2011084811 | A1 | 7/2011 |

*Primary Examiner* — Catherine S Branch
(74) *Attorney, Agent, or Firm* — Jiwen Chen; Joywin IP Law PLLC

(57) ABSTRACT

A polyelectrolyte hydrogel coating with strong substrate binding performance and a method of manufacturing the same are provided. The method includes: 1) activating a substrate by applying oxygen plasma; and 2) dissolving a polycationic polymer, a polymeric monomer, a silane coupling agent and an initiator to obtain a precursor solution, vacuumizing the precursor solution to remove air bubbles, applying the vacuumized precursor solution to a surface of the substrate activated by the oxygen plasma, and performing an in-situ polymerization and curing process under nitrogen or rare gas atmosphere. The polymeric monomer includes at least one of: acrylamide, acrylic acid, hydroxyethyl methacrylamide, 2-acrylamido-2-methyl-1-propanesulfonic acid, polyethylene glycol (diol) diacrylate, 2-methacryloxyethylphosphocholine, 3-[[2-(Methacryloyloxy) ethyl]dimethylammonio]propane-1-sulfonate, and 3-[[2-(methacryloyloxy)ethyl]dimethylammonium] propionate. The silane coupling agent has a carbon-carbon double bond functional group.

9 Claims, 3 Drawing Sheets

POLYELECTROLYTE HYDROGEL COATING WITH STRONG SUBSTRATE BINDING PERFORMANCE AND METHOD OF MANUFACTURING THE SAME

CROSS REFERENCE TO RELATED APPLICATIONS

The present application is a continuation application of International Patent Application No. PCT/CN2022/085269, filed on Apr. 6, 2022, which claims priority of a Chinese patent application No. 202110814384.0, filed on Jul. 19, 2021, and the entire contents of which are incorporated in their entireties.

TECHNICAL FIELD

The present disclosure relates to the field of biomedical materials, and in particular to a polyelectrolyte hydrogel coating with strong substrate binding performance and a method of manufacturing the polyelectrolyte hydrogel coating.

BACKGROUND

With the fast development of medical technologies and wide applications of medical devices, the compatibility between the devices and human bodies has become the key to the long-term safety of the devices. Biomedical coatings play crucial roles in improving the biocompatibility of medical implants and interventional medical devices, endowing the materials and devices with new therapeutic functions, and reducing the incidence of complications. For example, drug-eluting stents (DES) and drug-coated balloon (DCB) systems with anti-proliferation drugs dramatically reduce post-operative restenosis as compared with traditional bare stents and bare balloons, thus significantly improving the therapeutic efficacy for patients. Recently, hydrogels have become important components of functional medical materials due to their biomimetic structure of high water content and remarkable biocompatibility. Hydrophilic and lubricating hydrogel coatings are widely applied in medical catheters, guiding wires, and other devices to improve the in-vivo delivery and anticoagulation properties of the devices. However, it is noteworthy that clinical demands for medical coatings are not only limited to hydrophilicity and lubrication with the rapid development of medical devices, there remains an urgent need to explore novel hydrogel coatings with multiple functionalities. From the clinical perspective, the multifunctional hydrogel coating needs to meet the following requirements:

(I) The hydrogel coating needs to form a tough binding to an instruments and a device.

(II) Mechanical properties of the coating should be adjusted within a wide range to meet specified requirements of various devices.

(III) The hydrogel coating may allow loading of therapeutic species to realize combination products and devices.

To improve adhesion properties of the hydrogel coating to a substrate, a large number of surface modification techniques have been developed. For example, embedment of a hydrogen-abstractive type of photoinitiator (e.g. benzophenone) within the substrate has been proven to improve interfacial binding of the hydrogel coating via a C—H abstraction reaction (O. Prucker, T. Brandstetter, J. Ruhe, Biointerphases 2017, 13, 010801). However, properties of materials used for various devices may be significantly different from each other. Therefore, it is difficult to achieve similar modification effects on different types of materials. In addition, most of the surface modification techniques involve complicated processes, bringing challenges for quality control. Therefore, developing a simple and reliable coating technology with satisfied interfacial binding properties has remained as the key bottleneck in the current preparation of functional hydrogel coatings.

At the same time, a large number of studies have found that polyelectrolyte materials have a good mechanical regulation ability and a post-functionalization capacity. However, how to manufacture a polyelectrolyte coating in an efficient and controllable manner is a problem. In previous research, the inventor firstly proposed a polyelectrolyte composite spraying technology to manufacture the polyelectrolyte coating in a controllable manner. Based on the previous research, the present invention further improves the bonding ability between the polyelectrolyte coating and the substrate, and therefore realizes the preparation of polyelectrolyte hydrogel coatings with remarkable substrate binding performance, controllable mechanical property, and capacity for carrying functional species.

SUMMARY OF THE DISCLOSURE

In order to solve the above-mentioned technical problems and the deficiencies in the art, the present disclosure provides a method of manufacturing a polyelectrolyte hydrogel coating having strong substrate binding performance. The method may include processes, such as substrate oxygen plasma activation, polyelectrolyte gel coating preparation, coating in-situ polymerization and curing. An obtained polyelectrolyte hydrogel coating may have good biocompatibility and controllable mechanical properties. The coating may be universally applied to various substrates, having a strong interface bonding force with various substrates.

The method of manufacturing the polyelectrolyte hydrogel coating having strong substrate binding performance may include following operations.

1) The substrate may be activated by applying oxygen plasma.

2) A polycationic polymer, a polymeric monomer, a silane coupling agent, and an initiator may be dissolved to obtain a precursor solution. The precursor solution may be vacuumed to remove air bubbles and may be applied to a substrate surface activated by the oxygen plasma. In-situ polymerization and curing may be performed under nitrogen or rare gas atmosphere.

The polymeric monomer may include at least one of: acrylamide, acrylic acid, hydroxyethyl methacrylamide, 2-acrylamido-2-methyl-1-propanesulfonic acid, polyethylene glycol (diol) diacrylate, 2-methacryloxyethylphosphocholine, 3-[[2-(Methacryloyloxy)ethyl]dimethylammonio] propane-1-sulfonate (cas: 3637-26-1), and 3-[[2-(methacryloyloxy)ethyl]dimethylammonium] propionate.

The silane coupling agent has a carbon-carbon double bond functional group.

According to the present disclosure, the gel coating may be composed of a non-covalent bond energy dissipation network and a covalent bond cross-linking network, where the non-covalent bond energy dissipation network is composed of polycationic polymers, and the covalent bond cross-linking network is formed by in-situ polymerization of polymeric monomers and the silane coupling agent. The substrate involved in the present disclosure may be activated by the oxygen plasma. The polycation provides abundant non-covalent interactions (mainly hydrogen bonds and electrostatic interactions) for the gel to bind with the substrate. The silane coupling agent in the covalent bond cross-linking network provides support for regulating the mechanical properties of the gel coating and provides covalent bonding between the gel coating and the substrate, through hydrolysis and dehydration condensation reactions. In the present disclosure, a complex surface modification of the substrate is not required. The essential idea of the present disclosure includes the following. Firstly, the substrate is activated by the oxygen plasma. Subsequently, non-covalent bonding interactions between the polycations and the substrate may be effectively combined with covalent bonding between the in-situ polymerization of the covalent bond crosslinking network and the substrate, such that superior and universal substrate binding performance may be provided for the gel coating.

In the operation 1), the material of the substrate may include polydimethylsiloxane (PDMS), polyurethane (TPU), high density polyethylene (HDPE), polyamide (PA), polytetrafluoroethylene (PTFE), glass, ceramic, polyvinyl chloride (PVC), polyacrylate, and so on.

The material of the substrate may be preferably polyurethane, polyamide, glass or ceramic, depending on the strength of the bond between the prepared gel coating and the substrate.

In the operation 1), the oxygen may be applied as an activating atmosphere to perform plasma cleaning and activation treatment on the substrate. A frequency of the oxygen plasma generator may be preferably 40 KHz~13.56 MHz, more preferably 40 KHz or 13.56 MHz. Time consumed for the oxygen plasma activation may be preferably 2 min-60 min, and more preferably 15 min-60 min to ensure the extent of surface activation.

The oxygen plasma activated substrate may be preferably coated in 1 hour after the activation.

In the present disclosure, the polycationic polymer may be taken as raw material for preparing the coating. On one hand, processing properties, such as viscosity, of the gel precursor solution may be improved, such that the precursor solution may be suitable for various gel coating preparation methods. On the other hand, the polycationic polymer may provide extensive non-covalent interaction for excellent substrate binding performance for the gel coating, which is also the essential concept of the present disclosure.

In the operation 2), the polycationic polymer may include at least one of: collagen, gelatin, chitosan, chitosan-oligosaccharide, ε-polylysine, poly-L-lysine, poly-D-lysine, linear polyethyleneimine, branched polyethyleneimine, and polyallylamine. Since coating stability and biocompatibility may be required for the medical gel coating, the polycationic polymer may preferably be at least one of collagen, gelatin, chitosan, poly-L-lysine and poly-D-lysine.

Considering the strength of the binding between the prepared gel coating and the substrate, the polycationic polymer may preferably be one or more of chitosan, chitooligosaccharide, ε-polylysine, poly-L-lysine, poly-D-lysine, linear polyethyleneimine, branched polyethyleneimine, further preferably one or more of chitosan, chitooligosaccharide, linear polyethyleneimine, and branched polyethyleneimine.

In the operation 2), a weight mean molecular weight (Mw) of the polycationic polymer may be preferably in a range of 1000 Da to 300000 Da, more preferably in a range of 2000 Da to 150,000 Da. It is found in experiments that, the gel coating, prepared based on the polycationic polymer with molecular weight range mentioned above, may have a high substrate binding performance.

In order to meet the biocompatibility requirements for the medical gel coating, in the operation 2), the polymeric monomer may preferably be at least one of acrylic acid, hydroxyethyl methacrylate, 2-acryloylamino-2-methyl-1-propanesulfonic acid, polyethylene glycol (diol) diacrylate, 2-methacryloyloxyethyl phosphorylcholine, 3-[[2-(Methacryloyloxy)ethyl]dimethylammonio]propane-1-sulfonate.

A number mean molecular weight of the polyethylene glycol (diol) diacrylate may preferably be in a range of 200 Da to 20,000 Da.

In an operation S2), the silane coupling agent may include at least one of 3-(trimethoxymethylsilyl)propyl methacrylate (CAS: 115396-93-5), O-(methacryloxyethyl)-N-(triethoxysilyl propyl)carbamate (CAS: 115396-93-5), vinyltriethoxysilane, and vinyltrimethoxysilane. In order to meet requirements of a polymerization reaction activity, the silane coupling agent may be at least one of 3-(trimethoxymethylsilyl)propyl methacrylate, O-(methacryloyloxyethyl)-N-(triethoxysilylpropyl)carbamate.

An initiator type may determine a mode of the in-situ polymerization. In the operation 2), the initiator may be a photoinitiator. Accordingly, the polymerization may be performed under UV irradiation, and an intensity of the UV irradiation may be in a range of 10 mW/cm$^2$ to 200 mW/cm$^2$, and time for the UV polymerization may be in a range of 1 min to 30 min.

Alternatively, the initiator may be a thermal initiator. Accordingly, the in-situ polymerization may be performed by applying a heating treatment in a saturated humidity environment. A temperature for the polymerization may be in a range of 50° C.-80° C., and time for the polymerization may be in a range of 1 min-30 min.

In detail, the initiator may include, but is not limited to, benzophenone, 2,2'-azoisobutyronitrile (AIBN), 2-hydroxy-4'-(2-hydroxyethoxy)-2-methylpropiophenone (12959), and so on.

A proportion of the polycationic polymers in the gel precursor may be closely related to a processing property of the gel precursor solution and the property of the gel coating.

In the operation 2), when a total mass of the precursor solution is 100%, a mass fraction of the polycationic polymer may be preferably 0.2% to 20%, and more preferably 1% to 15%; a mass fraction of the polymeric monomer may be preferably 1% to 30%, and more preferably 10% to 30%; a mass fraction of the silane coupling agent may be preferably 0.1% to 5%; and a mass fraction of the initiator may be preferably 0.1% to 2%.

In an operation 2), a solvent of the precursor solution may be water or a mixture of water and ethanol. Some initiators may not be well soluble in water, and therefore, ethanol may be added appropriately to further solubilize the initiator. When a total mass of the precursor solution is 100%, a mass fraction of the ethanol may be preferably in a range of 1% to 50%.

In the operation 2), the gel precursor (i.e. the precursor solution) may be applied to the surface of the oxygen plasma activated substrate by applying any coating preparation method available in industry. The method may include spraying, spin coating, dip coating, casting and so on.

In the manufacturing method of the present disclosure, a curing process must be performed, since the silane coupling agent is applied. Preferably, in the operation 2), the curing process may be: performing an annealing and curing process at 50 to 80° C., for 0.5 hours to 6 hours, at a relative humidity greater than 70%.

The present disclosure also provides a polyelectrolyte hydrogel coating having strong substrate binding performance, which is manufactured by the above manufacturing method.

According to the present disclosure, on the surface of the oxygen plasma activated substrate, the non-covalent bond interactions between the polycations may be effectively combined with the covalent bond interaction of silane condensation, providing superb substrate binding properties for the gel coating. The non-covalent polycations provides strong energy dissipation properties for interfacial binding. Further, the covalent bond formed after the silane condensation provides stable chemical bonding for the gel coating. Combination of non-covalent bonding and the covalent bonding cooperatively provide the superb interfacial binding properties of the gel coating.

According to the present disclosure, following advantages may be achieved.

1. Complex and uncontrollable chemical modifications are not required to be performed on the substrate.

2. Addition of the polycationic polymer allows the precursor solution to be more suitable for dip coating, casting and other methods of gel coating preparation commonly used in industry.

3. When the ethanol is added to the precursor solution, in the method of the present disclosure, the precursor solution may be atomized and sprayed to the surface of devices and instruments with complex three-dimensional structures, significantly expanding the application scenarios of the present disclosure.

DETAILED DESCRIPTION

The present disclosure will be further described below by referring to the accompanying drawings and specific embodiments. It should be understood that these embodiments are described to illustrate the present disclosure only and do not limit the scope of the present disclosure. Any operation in the following embodiments, which does not have operating conditions, may be performed by following conventional conditions or conditions recommended by a manufacturer.

Example 1: Preparation of a Polyacrylic Acid/Polyethyleneimine Gel Coating (1) A precursor solution may be prepared as follows. Linear polyethyleneimine having a weight mean molecular weight of 70,000 may be taken as a polycation, and a mass fraction of the linear polyethyleneimine may be 10%. Acrylic acid may be taken as a precursor monomer, and a mass fraction of the acrylic acid may be 16.3%. 3-(trimethoxymethylsilyl) propyl methacrylate may be taken as a silane coupling agent, and a mass fraction of the 3-(trimethoxymethylsilyl) propyl methacrylate may be 0.5%. 12959 may be taken as a photoinitiator, and a mass fraction of the I2959 may be 0.5%. Deionized water may be taken as a solvent.

(2) Polyelectrolyte Gel Coating Preparation

An oxygen plasma cleaner at 13.56 MHz may be applied to treat substrates. The substrates may be glass, ceramic, PTFE, polyamide, polyethylene, polyurethane or polydimethylsiloxane. The substrates may be cleaned for 5 minutes. Further, substrate counterparts without activation by oxygen plasma may serve as controls.

The precursor solution may be applied uniformly to a surface of the substrates with activation by spin coating or the substrates without activation by spin coating. The coating may be polymerized under a 365 nm UV lamp and an Argon atmosphere. A UV light intensity may be 100 mW/cm$^2$, and time for polymerization may be 5 minutes.

Figure 1:
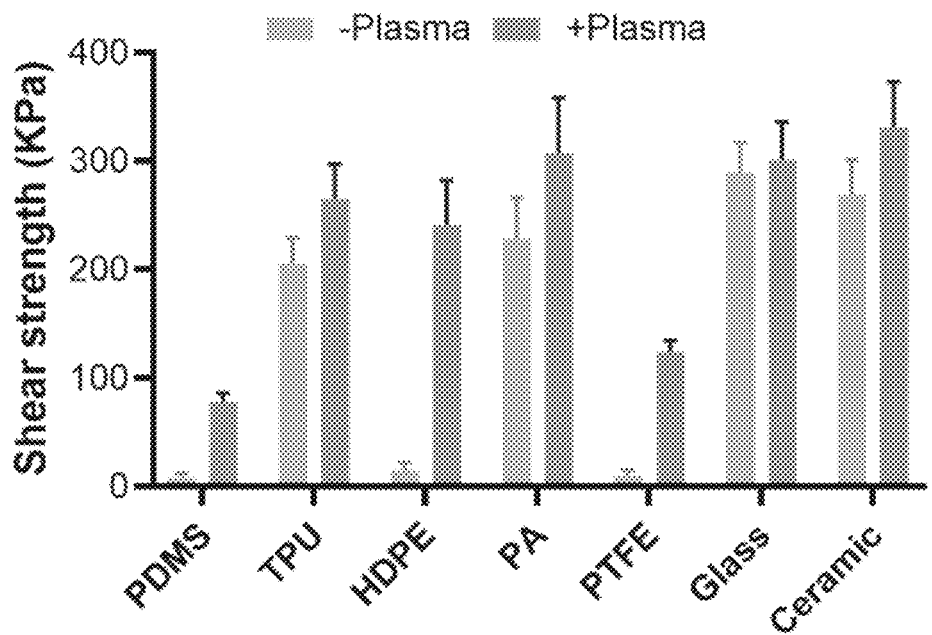
FIG. 1 shows test results of interfacial binding strength (top drawing, shear strength) and interface peeling energy (bottom, interfacial toughness) of the gel coatings applied to surfaces of substrates, which are made of various types of material, activated by oxygen plasma (+Plasma) or without activation by the oxygen plasma (−Plasma) according to Example 1 of the present disclosure.
Figure 1:
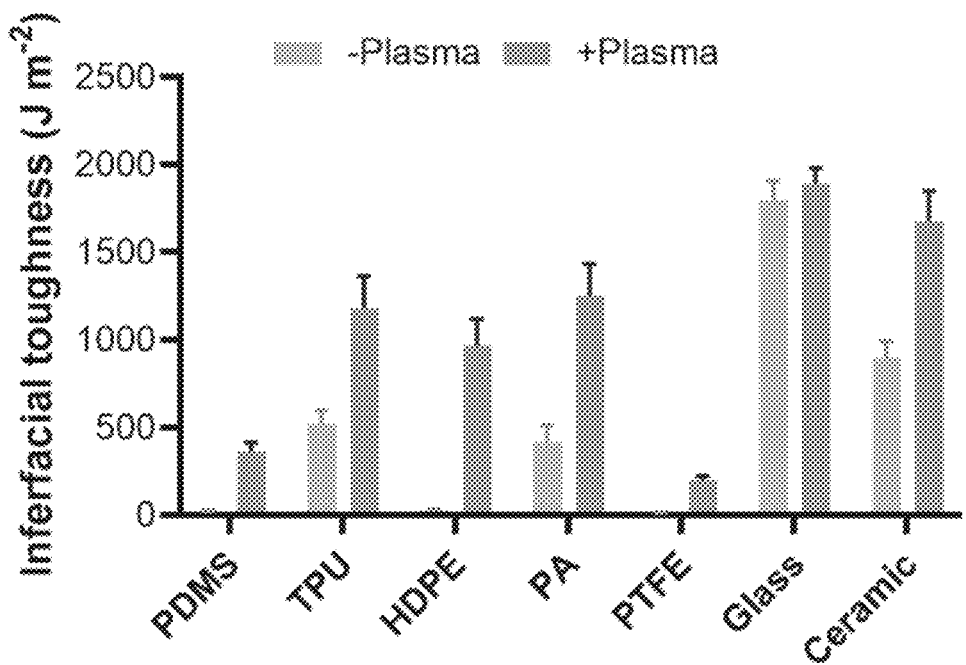
Figure 2:
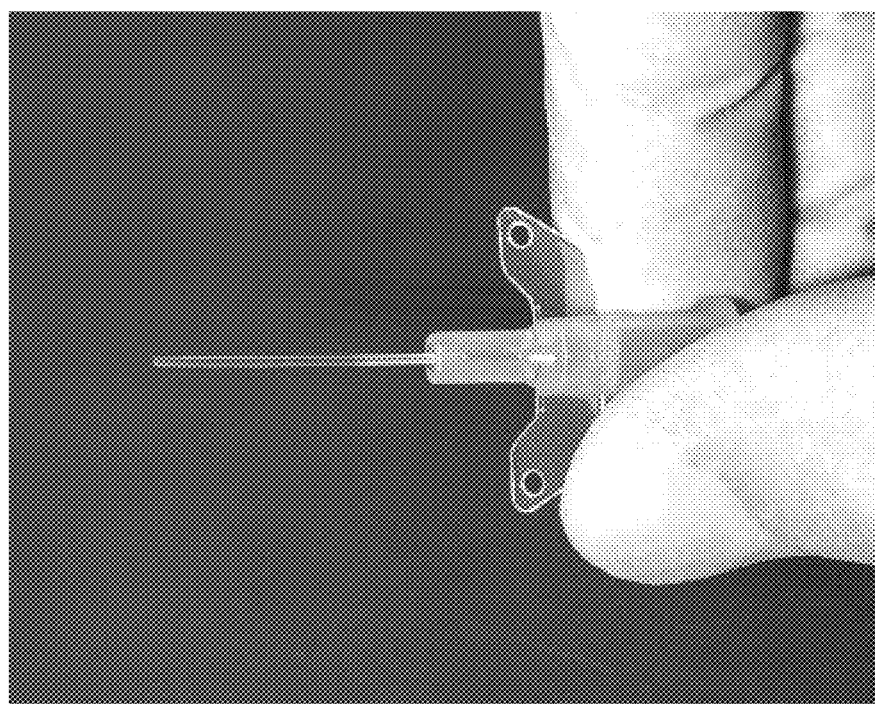
FIG. 2 shows a photograph of a retention needle on a surface that is sprayed with the gel coating by ultrasonic atomization according to Example 2 of the present disclosure.

(3) Gel coating may be cross-linked and cured as follows. The gel coating may be placed in a saturated humidity curing oven. A temperature of the oven may be set at 60° C. The gel coating may be cured for 0.5 hours. A universal tensile machine may be applied to perform a 180-degree shearing test and a shearing test, and test data of shear strength and an interface peel energy (interfacial toughness) of the gel coating on the surface of each substrate may be obtained, as shown in FIG. 1.

Example 2: Preparation of a Polyacrylic Acid/Chitosan Antimicrobial Lubricant Coating (1) The precursor solution may be prepared as follows. Chitosan having a weight mean molecular weight of 10,000 may be taken as the polycation, and a mass fraction of the chitosan may be 5%. Acrylic acid may be taken as the precursor monomer, and a mass fraction of the acrylic acid may be 20%. 3-(trimethoxymethylsilyl) propyl methacrylate may be taken as the silane coupling agent, and a mass fraction of the 3-(trimethoxymethylsilyl) propyl methacrylate may be 1%. 12959 may be taken as the photoinitiator, and a mass fraction of the I2959 may be 0.5%. Deionized water may be taken as the solvent.

(2) The polyelectrolyte gel coating may be prepared as follows. The oxygen plasma cleaner at 13.56 MHz may be applied to treat a polyurethane retention needle. The retention needle may be cleaned for 10 minutes. The precursor solution may be applied uniformly to the substrate surface by ultrasonic atomization. The coating may be polymerized under the 365 nm UV lamp and the Argon atmosphere. The intensity of the UV light of the UV lamp may be 60 mW/cm$^2$, and the time for polymerization may be 5 minutes.

(3) The gel coating may be cross-linked and curd as follows. The gel coating may be placed in the saturated humidity curing oven. The temperature of the oven may be set to 60° C. The gel coating maybe cured for 1 hour. A polyurethane sheet may serve as a coating adhesion test substrate, while the shear strength of the gel coating may be 285 KPa.

Example 3: Preparation of a Polyacrylic Acid/Poly-L-Lysine Gel Coating (1) The precursor solution may be prepared as follows. Poly-L-lysine having a weight mean molecular weight of 70,000 may be taken as the polycation, and a mass fraction of the poly-L-lysine may be 10%. Acrylic acid may be taken as the precursor monomer, and a mass fraction of the acrylic acid may be 20%. 3-(trimethoxymethylsilyl)propyl methacrylate may be taken as the silane coupling agent, and a mass fraction of the 3-(trimethoxymethylsilyl)propyl methacrylate may be 2%. I2959 may be taken as the photoinitiator, and a mass fraction of the I2959 may be 0.5%. A mixture of deionized water and ethanol may be taken as the solvent (a mass ratio may be 1/1).

(2) The polyelectrolyte gel coating may be prepared as follows. An oxygen plasma cleaner at 40 KHz may be applied to treat a polyurethane catheter. The polyurethane catheter may be cleaned for 15 minutes. The precursor solution may be applied uniformly to the substrate surface by ultrasonic atomization. The coating may be polymerized under the 365 nm UV lamp and the Argon atmosphere. The intensity of the UV light of the UV lamp may be 60 mW/cm$^2$, and the time for polymerization may be 10 minutes.

(3) The gel coating may be cross-linked and curd as follows. The gel coating may be placed in the saturated humidity curing oven. The temperature of the oven may be set to 60° C. The gel coating maybe cured for 0.5 hours. The polyurethane sheet may serve as the coating adhesion test substrate, while the shear strength of the gel coating may be 205 KPa.

Example 4: Preparation of a poly(2-methacryloyloxyethyl phosphorylcholine)/poly-D-lysine) Coating (1) The precursor solution may be prepared as follows. Poly-D-lysine) having a weight mean molecular weight of 70,000 may be taken as the polycation, and a mass fraction of the poly-D-lysine) may be 10%. 2-methacryloyloxyethyl phosphorylcholine may be taken as the precursor monomer, and a mass fraction of the 2-methacryloyloxyethyl phosphorylcholine may be 30%. O-(methacryloxyethyl)-N-(triethoxysilylpropyl)carbamate may be taken as the silane coupling agent, and a mass fraction of the O-(methacryloxyethyl)-N-(triethoxysilylpropyl)carbamate may be 2%. AIBN may be taken as a thermal initiator, and a mass fraction of the AIBN may be 1%. Deionized water may be taken as the solvent.

(2) The polyelectrolyte gel coating may be prepared as follows. The oxygen plasma cleaner at 13.56 MHz may be applied to treat a polyurethane central venous catheter. The catheter may be cleaned for 15 minutes. The precursor solution may be applied uniformly to the substrate surface by dip coating. The coating may be polymerized under the Argon atmosphere and a saturate humidity environment, without light exposure. The coating may be polymerized at 60° C. for 1 hour.

(3) The gel coating may be cross-linked and curd as follows. The gel coating may be placed in the saturated humidity curing oven. The temperature of the oven may be set to 80° C. The gel coating maybe cured for 1 hour. The polyurethane sheet may serve as the coating adhesion test substrate, while the shear strength of the gel coating may be 155 KPa.

Example 5: Preparation of a Polyhydroxyethyl Methacrylate/Gelatin Gel Coating (1) The precursor solution may be prepared as follows. 300 g bloom of gelatin may be taken as the polycation, and a mass fraction of the gelatin may be 10%. Hydroxyethyl methacrylate may be taken as the precursor monomer, and a mass fraction of the hydroxyethyl methacrylate may be 15%. 3-(trimethoxymethylsilyl)propyl methacrylate may be taken as the silane coupling agent, and a mass fraction of the 3-(trimethoxymethylsilyl)propyl methacrylate may be 2%. Benzophenone may be taken as the photoinitiator, and a mass fraction of the benzophenone may be 0.5%. A mixture of deionised water and the ethanol may be taken as the solvent (a mass ratio may be 2/1).

(2) The polyelectrolyte gel coating may be prepared as follows. The oxygen plasma cleaner at 40 KHz may be applied to treat a polylactic acid bone plate. The polylactic acid bone plate may be cleaned for 20 minutes. The precursor solution may be applied uniformly to the substrate surface by air-atomization spraying. The coating may be polymerized under the 365 nm UV lamp and the Argon atmosphere. The intensity of the UV light of the UV lamp may be 80 mW/cm$^2$, and the time for polymerization may be 20 minutes.

(3) The gel coating may be cross-linked and curd as follows. The gel coating may be placed in the saturated humidity curing oven. The temperature of the oven may be set 50° C. The gel coating maybe cured for 1 hour. The polyurethane sheet may serve as the coating adhesion test substrate, while the shear strength of the gel coating maybe 130 KPa.

Example 6: Preparation of a 3-[[2-(Methacryloyloxy)ethyl]dimethylammonio]propane-1-sulfonate/ Collagen Gel Coating (1) The precursor solution may be prepared as follows. Type IV collagen may be taken as the polycation, and a mass fraction of the type IV collagen may be 1%. 3-[[2-(Methacryloyloxy)ethyl]dimethylammonio]propane-1-sulfonate may be taken as the precursor monomer, and a mass fraction of the methacryloyl ethyl sulfobetaine may be 20%. Vinyl trimethoxysilane may be taken as the silane coupling agent, and a mass fraction of the vinyl trimethoxysilane may be 2%. Benzophenone may be taken as the photoinitiator, and a mass fraction of the benzophenone may be 0.5%. A mixture of deionized water and ethanol may be taken as the solvent (a mass ratio may be 10/1).

(2) The polyelectrolyte gel coating may be prepared as follows. The oxygen plasma cleaner at 13.56 KHz may be applied to treat a ceramic dental implant. The implant may be cleaned for 15 minutes. The precursor solution may be applied uniformly to the substrate surface by scraping. The coating may be polymerized under the 365 nm UV lamp and the Argon atmosphere. The intensity of the UV light of the UV lamp may be 100 mW/cm$^2$, and the time for polymerization may be 10 minutes.

(3) The gel coating may be cross-linked and curd as follows. The gel coating may be placed in the saturated humidity curing oven. The temperature of the oven may be set to 80° C. The gel coating maybe cured for 2 hours. The polyurethane sheet may serve as the coating adhesion test substrate, while the shear strength of the gel coating may be 120 KPa.

Example 7: Preparation of a poly-2-acryloylamino-2-methyl-1-propanesulfonic Acid/Poly-L-Lysine Gel Coating (1) The precursor solution may be prepared as follows. Poly(levulinic acid) having a weight mean molecular weight of 100,000 may be taken as the polycation, and a mass fraction of the poly(levulinic acid) may be 5%. 2-acryloylamino-2-methyl-1-propanesulfonic acid may be taken as the precursor monomer, and a mass fraction of the 2-acryloylamino-2-methyl-1-propanesulfonic acid may be 20%. 3-(trimethoxymethylsilyl)propyl methacrylate may be taken as the silane coupling agent, and a mass fraction of the 3-(trimethoxymethylsilyl)propyl methacrylate may be 1%. Benzophenone may be taken as the photoinitiator, and a mass fraction of the benzophenone may be 0.5%. A mixture of deionized water and ethanol may be taken as the solvent (a mass ratio may be 1/1).

(2) The polyelectrolyte gel coating may be prepared as follows. The oxygen plasma cleaner at 13.56 KHz may be applied to treat a polyacrylate lens implant. The implant may be cleaned for 15 minutes. The precursor solution may be applied uniformly to the substrate surface by ultrasonic spraying. The coating may be polymerized under the 365 nm UV lamp and the Argon atmosphere. The intensity of the UV light of the UV lamp may be 80 mW/cm$^2$, and the time for polymerization may be 10 minutes.

(3) The gel coating may be cross-linked and curd as follows. The gel coating may be placed in the saturated humidity curing oven. The temperature of the oven may be set to 50° C. The gel coating maybe cured for 1 hour Example 8: Preparation of a poly-2-acryloylamino-2-methyl-1-propanesulfonic Acid/Chitosan Lubricant Gel Coating (1) The precursor solution may be prepared as follows. Chitosan having a weight mean molecular weight of 10,000 may be taken as the polycation, and a mass fraction of the chitosan may be 3%. 2-acryloylamino-2-methyl-1-propanesulfonic acid may be taken as the precursor monomer, and a mass fraction of the 2-acryloylamino-2-methyl-1-propanesulfonic acid may be 20%. 3-(trimethoxymethylsilyl)propyl methacrylate may be taken as the silane coupling agent, and a mass fraction of the 3-(trimethoxymethylsilyl)propyl methacrylate may be 0.5%. 12959 may be taken as the photoinitiator, and a mass fraction of the I2050 may be 0.5%. Deionized water may be taken as the solvent.

(2) The polyelectrolyte gel coating may be prepared as follows. The oxygen plasma cleaner at 13.56 KHz may be applied to treat a surface of a PVC guidewire. The guidewire may be cleaned for 5 minutes. The precursor solution may be applied uniformly to the substrate surface by lift and dip coating. The coating may be polymerized under the 365 nm UV lamp and the Argon atmosphere. The intensity of the UV light of the UV lamp may be 120 mW/cm$^2$, and the time for polymerization may be 5 minutes.

(3) The gel coating may be cross-linked and curd as follows. The gel coating may be placed in the saturated humidity curing oven. The temperature of the oven may be set to 50° C. The gel coating maybe cured for 0.5 hours.

Figure 3:
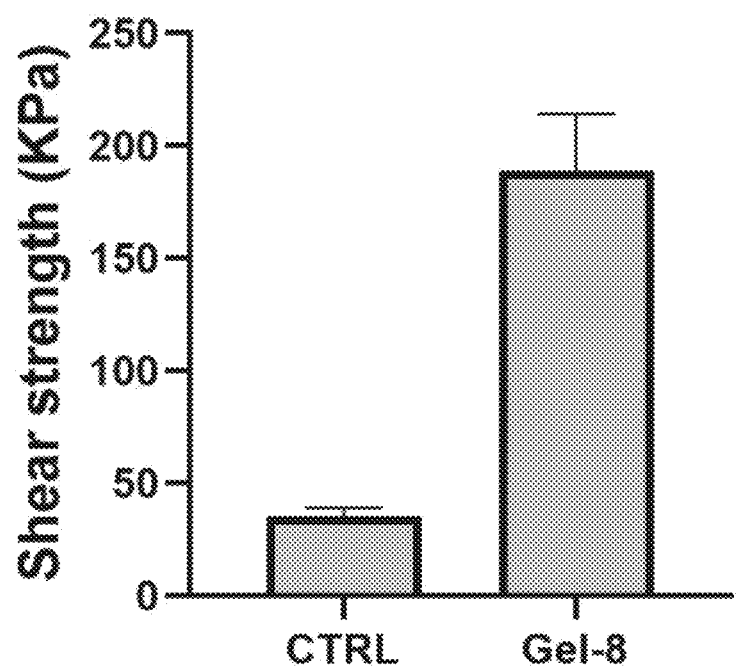
FIG. 3 shows a comparison of test results of interfacial binding (Shear strength) between the gel coating and the PVC substrate prepared in Example 8 and Comparative Example 1.

In order to test the binding strength between the coating and the PVC substrate, the coating may be prepared on a PVC sheet by performing the above method. Subsequently, the gel coating may be fixedly adhered to the glass by 502 glue. An 180-degree shearing test may be performed to test the shear strength of the coating and the PVC substrate. Results are shown in a Gel-8 group in FIG. 3, and the shear strength of the gel coating may be greater than 150 KPa.

Comparative Example 1: Preparation of a poly-2-acryloylamino-2-methyl-1-propanesulfonic Acid/Chitosan Control Gel Coating (1) The precursor solution may be prepared as follows. Chitosan having a weight mean molecular weight of 10,000 may be taken as the polycation, and a mass fraction of the chitosan may be 3%. 2-acryloylamino-2-methyl-1-propanesulfonic acid may be taken as the precursor monomer, and a mass fraction of the 2-acryloylamino-2-methyl-1-propanesulfonic acid may be 20%. Methylenebisacrylamide may be taken as the coupling agent, and a mass fraction of the methylenebisacrylamide may be 0.5%. 12959 may be taken as the photoinitiator, and a mass fraction of the I2959 may be 0.5%. Deionized water may be taken as the solvent.

(2) The polyelectrolyte gel coating may be prepared as follows. The oxygen plasma cleaner at 13.56 KHz may be applied to treat a surface of a PVC guidewire. The guidewire may be cleaned for 5 minutes. The precursor solution may be applied uniformly to the substrate surface by lift and dip coating. The coating may be polymerized under the 365 nm UV lamp and the Argon atmosphere. The intensity of the UV light of the UV lamp may be 120 mW/cm$^2$, and the time for polymerization may be 5 minutes.

As no silane coupling agent is used, the curing operation is not required.

The coating of the comparative example may be prepared on the PVC sheet by applying the above method, and the gel coating may be subsequently fixedly adhered to the glass by 502 glue. The 180-degree shearing test may be performed to test the shear strength of the coating and the PVC substrate. Results are shown in a CTRL group in FIG. 3, and the shear strength of the gel coating may be less than 50 KPa. The results indicate that the addition of the silane coupling agent in the present disclosure significantly increases the interfacial binding strength of the gel coating.

Comparative Example 2: Preparation of a poly-2-acryloylamino-2-methyl-1-propanesulfonate/Dextran Control Gel Coating (1) The precursor solution may be prepared as follows. Dextran having a weight mean molecular weight of 10,000 may be taken as an electrically neutral macromolecular material, and a mass fraction of the dextran may be 3%. 2-acryloylamino-2-methyl-1-propanesulfonic acid may be taken as the precursor monomer, and a mass fraction of the 2-acryloylamino-2-methyl-1-propanesulfonic acid may be 20%. 3-(trimethoxymethylsilyl) propyl methacrylate may be taken as the silane coupling agent, and a mass fraction of the 3-(trimethoxymethylsilyl) propyl methacrylate may be 0.5%. 12959 may be taken as the photoinitiator, and a mass fraction of the I2959 may be 0.5%. Deionized water may be taken as the solvent.

(2) The polyelectrolyte gel coating may be prepared as follows. The oxygen plasma cleaner at 13.56 KHz may be applied to treat a surface of a PVC guidewire. The guidewire may be cleaned for 5 minutes. The precursor solution may be applied uniformly to the substrate surface by lift and dip coating. The coating may be polymerized under the 365 nm UV lamp and the Argon atmosphere. The intensity of the UV light of the UV lamp may be 120 mW/cm$^2$, and the time for polymerization may be 5 minutes.

(3) The gel coating may be cross-linked and curd as follows. The gel coating may be placed in the saturated humidity curing oven. The temperature of the oven may be set to 50° C. The gel coating maybe cured for 0.5 hours.

Figure 4:
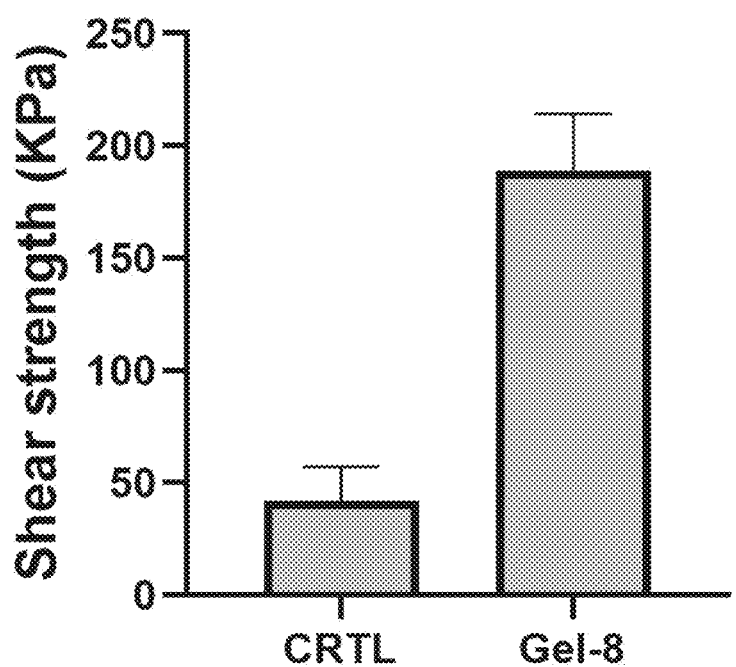
FIG. 4 shows a comparison of test results of interfacial binding (Shear strength) between the gel coating and the PVC substrate prepared in Example 8 and in Comparative Example 2.

The coating of the comparative example may be prepared on the PVC sheet by applying the above method, and the gel coating may be subsequently fixedly adhered to the glass by 502 glue. The 180-degree shearing test may be performed to test the shear strength of the coating and the PVC substrate. Results are shown in a CTRL group in FIG. 4, and the shear strength of the gel coating may be less than 50 KPa. The results indicate that the polycationic polymer in the present disclosure significantly increases the interfacial binding strength of the gel coating.

Furthermore, it shall be understood that after reading the above description of the present disclosure, the person skilled in the field may make various alterations or modifications to the present disclosure, which shall fall within the scope of the present disclosure.

What is claimed is:

1. A method of manufacturing a polyelectrolyte hydrogel coating with strong substrate binding performance, comprising:
    1) activating a substrate by applying oxygen plasma; and
    2) dissolving a polycationic polymer, a polymeric monomer, a silane coupling agent and an initiator to obtain a precursor solution, vacuumizing the precursor solution to remove air bubbles, applying the vacuumized precursor solution to a surface of the substrate activated by the oxygen plasma, and performing an in-situ polymerization and curing process under nitrogen or rare gas atmosphere;
    wherein the polymeric monomer comprises at least one of: acrylamide, acrylic acid, hydroxyethyl methacrylamide, 2-acrylamido-2-methyl-1-propanesulfonic acid, polyethylene glycol (diol) diacrylate, 2-methacryloxyethyl phosphocholine, 3-[[2-(Methacryloyloxy)ethyl]dimethylammonio]propane-1-sulfonate, and 3-[[2-(methacryloyloxy)ethyl]dimethylammonium] propionate;
    the silane coupling agent has a carbon-carbon double bond functional group and comprises at least one of 3-(trimethoxymethylsilyl)propyl methacrylate, O-(methacryloyloxyethyl)-N-(triethoxysilyl propyl) carbamate, and vinyltriethoxysilane, vinyltrimethoxysilane.

2. The method according to claim 1, wherein, in the operation 1), material of the substrate comprises at least one of polydimethylsiloxane, polyurethane, high density polyethylene, polyamide, polytetrafluoroethylene, glass, ceramic, and polyvinyl chloride.

3. The method according to claim 1, wherein, in the operation 1), a frequency of an oxygen plasma generator is in a range of 40 KHz to 13.56 MHz, and time for oxygen plasma activation is in a range of 2 minutes to 60 minutes.

4. The method according to claim 1, wherein, in the operation 2), the polycationic polymer comprises at least one of collagen, gelatin, chitosan, chitosan-oligosaccharide, ε-polylysine, poly-L-lysine, poly-D-lysine, linear polyethyleneimine, branched polyethyleneimine, polyallylamine; and a weight mean molecular weight of the polycationic polymer is in a range of 1000 Da to 300000 Da.

5. The method according to claim 1, wherein, in the operation 2), wherein the initiator is a photoinitiator, and the in-situ polymerization process is performed under ultraviolet light irradiation, an intensity of the ultraviolet light is in a range of 10 mW/cm$^2$ to 200 mW/cm$^2$, and time for the polymerization process under the ultraviolet light irradiation is in a range of 1 minute to 30 minutes; or the initiator is a thermal initiator, the in-situ polymerization process is performed under saturated humidity and heating, a temperature for the polymerization process is in a range of 50° C. to 80° C., and time for the polymerization process is in a range of 1 minute to 30 minutes.

6. The method according to claim 1, wherein, in the operation 2), when a total mass of the precursor solution is 100%, a mass fraction of the polycationic polymer is in a range of 0.2% to 20%; a mass fraction of the polymeric monomer is in a range of 1% to 30%; a mass fraction of the silane coupling agent is in a range of 0.1% to 5%; and a mass fraction of the initiator is in a range of 0.1% to 2%.

7. The method according to claim 1, wherein, in the operation 2), a solvent of the precursor solution is water or a mixture of water and ethanol.

8. The method according to claim 1, wherein, in the operation 2), the curing process comprises: performing an annealing and curing process at 50° C. to 80° C., for 0.5 hours to 6 hours, at relative humidity greater than 70%.

9. A polyelectrolyte hydrogel coating having strong substrate binding performance, manufactured by performing the method according to claim 1.

* * * * *